US012736044B2

(12) United States Patent
Hadas

(10) Patent No.: US 12,736,044 B2
(45) Date of Patent: Sep. 15, 2026

(54) TUNED MICRO CHECK VALVES AND PUMPS

(71) Applicant: Q T FLOW LTD, Tel Aviv (IL)

(72) Inventor: Noam Hadas, Tel Aviv (IL)

(73) Assignee: Q T FLOW LTD, Tel Aviv (IL)

( * ) Notice: Subject to any disclaimer, the term of this patent is extended or adjusted under 35 U.S.C. 154(b) by 0 days.

(21) Appl. No.: 17/629,722

(22) Filed: Jan. 24, 2022

(65) Prior Publication Data

US 2022/0252062 A1 Aug. 11, 2022

Related U.S. Application Data

(63) Continuation-in-part of application No. PCT/IL2020/050813, filed on Jul. 22, 2020.

(60) Provisional application No. 62/877,317, filed on Jul. 23, 2019.

(51) Int. Cl.
*F04B 43/04* (2006.01)
*F04B 53/10* (2006.01)
*F16K 99/00* (2006.01)

(52) U.S. Cl.
CPC ........ *F04B 43/046* (2013.01); *F04B 53/1037* (2013.01); *F16K 2099/0094* (2013.01)

(58) Field of Classification Search
CPC .... F04B 43/043; F04B 43/046; F04B 19/006; F04B 39/1073; F04B 53/1037; F04B 53/1047
See application file for complete search history.

(56) References Cited

U.S. PATENT DOCUMENTS 6,109,889 A * 8/2000 Zengerle ............... F04B 43/046 417/413.2
6,261,066 B1 7/2001 Linnemann
6,514,047 B2 2/2003 Burr
2002/0155010 A1 10/2002 Karp
2004/0018100 A1 1/2004 Takagi
2011/0061526 A1 3/2011 Wackerle

FOREIGN PATENT DOCUMENTS

CN 105089993 A * 11/2015
DE 102010011562 A1 12/2010
EP 0703364 A1 * 3/1996

OTHER PUBLICATIONS

English machine translation of CN-105089993-A (Year: 2015).*
(Continued)

*Primary Examiner* — Nathan C Zollinger
(74) *Attorney, Agent, or Firm* — Tarolli, Sundheim, Covell & Tummino LLP

(57) ABSTRACT

A fluid pump for pumping a fluid between a fluid inlet and a fluid outlet has a chamber with an inlet and an outlet. At least one flow restricting element is disposed at a flow line portion and is configured to resonate along a continuum of states between a first end state and a second end state to thereby affect fluid flow profile through said inlet or said outlet. While resonating the element transitions through a range of states differing in the flow they permit. A driver is configured to modulate conditions in the chamber or on the at least one flow restricting element at a characteristic frequency profile, thereby inducing the at least one flow restricting element to resonate between the first and second states at about said characteristic frequency profile.

18 Claims, 8 Drawing Sheets

(56) References Cited

OTHER PUBLICATIONS

English machine translation of EP-0703364-A1 (Year: 1996).*
International Search Report and Written Opinion dated May 9, 2021 for corresponding International Application No. PCT/IL2021/050095.
Van Lintel et al., (1988) "A Piezoelectric Micropump Based on Micrmachining of Silicon", Sensors & Actuators, vol. 15, pp. 153-167.
Olsson et al, (1997) "The First Valve-less Diffuser Gas Pump", Proceedings MEMS vol. 97, pp. 108-113, Nagoya, Japan.
International Search Report and Written Opinion dated Oct. 23, 2020 for corresponding International Application No. PCT/IL2020/050813.

* cited by examiner

TUNED MICRO CHECK VALVES AND PUMPS

TECHNOLOGICAL FIELD

The present disclosure is in the field of micropumps, in particular resonance-based micropumps.

BACKGROUND ART

References considered to be relevant as background to the presently disclosed subject matter are listed below:

U.S. Pat. No. 6,261,066

E. Quandt, K. Seemann, Magnetostrictive Thin Film Microflow Devices, Micro System Technologies 96, pp. 451-456, VDE-35 Verlag GmbH, 1996;

B. Bustgens et al, Micromembrane Pump Manufactured by Molding, Proc. Actuator 94; Bremen 1994, pp. 86-90. EP-A-0134614 and H. T. G.

Van Lintel et al, A Piezoelectric Micropump Based on Micromachining of Silicon, Sensors & Actuators, 15, 1988, pp. 153-167;

A. Olsson et al: The First Valve-less Diffuser Gas Pump, Proceedings MEMS 97, pp. 108-113, Nagoya, Japan, 1997.

Acknowledgement of the above references herein is not to be inferred as meaning that these are in any way relevant to the patentability of the presently disclosed subject matter.

GENERAL DESCRIPTION

The present disclosure provides a pump that is configured to pump fluid in a wide range of pressures and throughputs. The pump is defined along a flow path between an inlet and an outlet and includes a chamber downstream the inlet and upstream the outlet. One or more flow restricting/controlling elements, each is disposed along the flow path to affect the flow profile through the inlet or the outlet. Typically, the pump includes two flow restricting elements, a first disposed at a first location along the flow path to affect the flow profile through the inlet and a second flow restricting element disposed at a second location along the flow path to affect the flow profile through the outlet. The flow restricting elements cyclically transitioning between a range of flow permitting states, in which fluid flows through the inlet or the outlet, and a range of flow restricting states, in which the flow of the fluid is restricted through the inlet or the outlet, namely the flow flux is in the range of flow restricting states is less than in the range of flow permitting states. The state of the flow restricting elements are transitioned in response to a modulation of conditions within the chamber, typically volume or pressure, resulting in application of harmonic forces on the elements. A driver is configured to apply said modulation of conditions at a selected characteristic frequency profile, e.g. modulating the volume of the chamber at a cyclically manner between a first volume and a second volume that affects the pressure in the chamber in the same manner. The change of the pressure within the chamber results in the continuous cyclically transitioning of the states of the flow restricting elements and thus the flow profile of the fluid through the inlet and outlet that yields the pumping effect.

Thus, an aspect of the present disclosure provides a fluid pumping arrangement for pumping a fluid between a fluid inlet and a fluid outlet. The fluid pumping arrangement may have two configurations.

In the first configuration, the fluid pumping arrangement includes a chamber, which can be defined as a volume between the inlet and the outlet. The chamber comprises an inlet and an outlet for allowing flow of fluid into and out of the chamber. The pumping arrangement further includes at least one flow restricting element disposed at a flow line portion and configured to resonate along a continuum of states between a first end state and a second end state, thereby affecting fluid flow profile through said inlet or outlet, wherein in one or more first ranges of states the flow through the inlet or the outlet is less than the flow in the one or more second ranges of states.

It is to be noted that the end states can vary between one mode of operation of the fluid pumping arrangement to another. For example, the end states can be affected by the pressure conditions in the chamber, by the viscosity of the fluid, or by other conditions. Thus, the end states merely define the entire range of states of the flow restricting elements in a selected mode of operation.

The range can be a continuous range, namely all the states of the first range are continuous to one another. Alternatively, one range of the first states can be non-continuous to another range of first states, separated by a range of second states. Similarly, the second range of states can be a continuous range, namely all the states of the second range are continuous to one another. Alternatively, one range of the second states can be non-continuous to another range of second states, separated by a range of first states. The flow in the first ranges is restricted by the restricting element to some degree, the restriction degree can be altered between different states of one or more of the first ranges of states, and the flow in the second range of states is greater than the flow in the first range of states, namely substantially permitting the fluid to flow.

The term "substantially permitting the fluid to flow" should be understood with respect to the ratio between the flux of flow through the inlet/outlet or the flow line portion between the first range of states and the second range of states. In particular, the flux of flow in the first, flow restricting range of states is at least less by 30%, 40%, 50%, 60%, 70%, 80%, 90%, 95%, 96%, 97%, 98%, 99% or at times 100% than the second, flow permitting range of states.

A driver is configured to modulate conditions in the chamber or on the at least one flow restricting element at a characteristic frequency profile, thereby resulting the at least one flow restricting element to matchingly resonate between the first and second end states at about said characteristic frequency profile.

As used herein the term "about" refers to ±10% or at times ±20% from the value it is referred to. For example, the term about 100 Hz refers to a range between 80 Hz and 120 Hz.

In the second configuration, the fluid pumping arrangement includes two flow restricting/controlling elements in flow communication with a fluid chamber arranged along the flow path such that said chamber is downstream a first element of the two elements and upstream a second element of the two elements. A driver is configured for cyclically modulating volume or pressure in said chamber in a driver frequency, the frequency is selected according to characteristics of the flow restricting elements. Each of said two elements is being configured for continuous cyclical change of states between one or more first, flow-restricting range of states and one or more second, flow-permitting range of states, in response to the cyclical modulation of the volume or pressure. The cyclical change of state of the first element is phase shifted to that of the second element. In some specific embodiments, the cyclical change of the state of the first element is antiphase to that of the second element, namely when the first flow restricting element is at one of the first range of states, the second flow restricting element is at one of the second range of states and vice versa. The flow restricting elements have an element resonance frequency, being the same for both elements, and they are both being capable of reciprocation at the resonance frequency. The driver is configured to be set with about said resonance frequency.

The following embodiments may apply for any of the above configuration of the first aspect.

In some embodiments of the fluid pumping arrangement, the at least one flow restricting element is disposed at the inlet or at a flow line portion affecting fluid flow profile through the inlet.

In some embodiments, the fluid pumping arrangement comprises two flow restricting elements, an inlet flow restricting element disposed at the inlet or at a flow line portion affecting fluid flow profile through the inlet and an outlet flow restricting element disposed at the outlet or at a flow line portion affecting fluid flow profile through the outlet.

It is to be noted that the fluid pumping arrangement may include more than one flow restricting element at the inlet or the outlet or at any other portion along the flow line that affect the flow profile therethrough.

In some embodiments of the fluid pumping arrangement, the range of states or the state of a first flow restricting element, e.g. an inlet flow restricting element, is phase shifted with respect to the range of states or the state of a second flow restricting element, e.g. an outlet flow restricting element. In other words, while a first flow restricting element is at a certain state, e.g. a first blocking or permitting state, the second flow restricting element is in a second blocking or permitting state, different than the first.

In some embodiments of the fluid pumping arrangement, the inlet flow restricting element and the outlet flow restricting element are configured to switch between the first and the second range of states in an antiphase manner, namely, when one element is in the first range of states, the other element is in the second range of states and vice versa.

In some embodiments, the fluid pumping arrangement includes a single first range of first states and a single range of second states. The first range of states is defined between a first end state and a transition state and the second range of states is defined between the transition state and the second end state, namely the first range of states and the second range of states are continuous to one another. It is to be noted that the transition state is the state in which the restricting element switches from a first range of states to a second range of states and vice versa. The transition state can be defined as the last state of one of the first and second range of states that.

In some embodiments of the fluid pumping arrangement, the driver is configured to modulate the chamber's volume or pressure at said characteristic frequency profile.

In some embodiments of the fluid pumping arrangement, the driver comprises a diaphragm or a membrane that is configured to change its characteristic to result in said modulation of conditions.

In some embodiments of the fluid pumping arrangement, the driver comprises a piezoelectric component configured to receive voltage profile at said characteristic frequency profile.

In some embodiments of the fluid pumping arrangement, the at least one flow restricting element is a flap or a leaf.

In some embodiments of the fluid pumping arrangement, the flap is fixed at one of its side and its opposite, free side has an edge that is proximal to a wall portion of said flow line. While resonating, the distance between said edge and said wall portion varies and defining whether the flow restricting element is in the first range of states or in the second range of states.

In some embodiments of the fluid pumping arrangement, the free side of the flap is configured for contact free harmonically oscillation.

In some embodiments of the fluid pumping arrangement, the fluid line portion is defined by peripheral walls having a longitudinal cross section profile, said at least one flow restricting element spans at least a portion of said longitudinal cross section profile and is rotatable around an axis between a first and second rotational positions, a resting, neutral, position is defined between the first and second rotational positions, said first state is defined at a certain range of rotational positions between the resting position and the first portion, and said second state is defined at a certain range of rotational positions between the resting position and the second portion or vice versa.

In some embodiments of the fluid pumping arrangement, the fluid line portion has a varying longitudinal cross section profile, said at least one flow restricting element spans at least a portion of said longitudinal cross section profile and is deformable to define said one or more first range of states and said one or more second range of states.

In some embodiments of the fluid pumping arrangement, the at least one flow restricting element is harmonically resonating oscillation between a first and second rotational positions, and a resting, neutral, position is defined between the first and second rotational positions said first state is defined at a certain range of rotational positions between the resting position and the first portion, and said second state is defined at a certain range of rotational positions between the resting position and the second portion or vice versa.

In some embodiments of the fluid pumping arrangement, the at least one flow restricting element is harmonically oscillating between deformation states defining said one or more first range of states and said one or more second range of states.

In some embodiments of the fluid pumping arrangement, the harmonic resonance oscillation of said at least one flow restricting element is contact-free. Namely, the at least one flow restricting element oscillates around said axis without contacting other walls or elements during the whole oscillation profile.

In some embodiments of the fluid pumping arrangement, the first state is defined by restricting flow of fluid by at least 50% with respect to the second state, or at least 60%, 70%, 80%, 90%, 95%, 96%, 97%, 98%, 99% or at times 100% with respect to the second state.

Another aspect of the present disclosure provides a method for generating fluid pressure. The method comprising modulating conditions in a chamber having a fluid inlet and a fluid outlet at a characteristic frequency profile. The fluid flow through at least one of said fluid inlet and fluid outlet is controlled by at least one fluid restricting element and said modulating results in matchingly continuum resonance of said at least one flow restricting element between a first and second end states. In one or more first ranges of states, the flow through the inlet or the outlet is less than the flow in one or more second ranges of states. Namely, the first range of states substantially restricts flow of fluid through the inlet or the outlet, and the second range of states permits flow through the inlet or the outlet.

In some embodiments of the method, the fluid flow through the inlet is controlled by an inlet fluid restricting element and the fluid flow through the outlet is controlled by an outlet fluid restricting element.

In some embodiments of the method, the range of states or the state of a first flow restricting element, e.g. an inlet flow restricting element, is phase shifted with respect to the range of states or the state of a second flow restricting element, e.g. an outlet flow restricting element. In other words, while a first flow restricting element is at a certain state, e.g. a first blocking or permitting state, the second flow restricting element is in a second blocking or permitting state, different than the first In some embodiments of the method, the inlet flow restricting element and the outlet flow restricting element are configured to switch between the first and the second range of states in an antiphase manner. Namely, when one is in the first state, the other is in the second state and vice versa.

In some embodiments of the method, the modulating comprises modulating the volume or pressure of said chamber.

In some embodiments of the method, the at least one flow restricting element is harmonically oscillating between deformation states defining said one or more first range of states and said one or more second range of states.

In some embodiments of the method, the at least one flow restricting element is harmonically resonating oscillation between a first and second rotational positions, and a resting, neutral, position is defined between the first and second rotational positions said first state is defined at a certain range of rotational positions between the resting position and the first portion, and said second state is defined at a certain range of rotational positions between the resting position and the second portion or vice versa.

In some embodiments of the method, the harmonic resonance oscillation of said at least one flow restricting element is contact-free. Namely, the at least one flow restricting element oscillates around said axis without contacting other walls or elements during the whole oscillation profile.

In some embodiments of the method, the first range of states restricting flow of fluid by at least 30% with respect to the second range of states, or at least 40%, 50%, 60%, 70%, 80%, 90%, 95%, 96%, 97%, 98%, 99% or at times 100% with respect to the second state.

Yet another aspect of the present disclosure provides a pressure-responsive valve comprising a valve chamber defined by a chamber wall having an opening fluidly interconnecting said chamber with environment; and a valve flap configured for undergoing continuous resonant vibration alternatively opening and at least partially blocking said opening.

In some embodiments of the pressure-responsive valve, the flap has a distal portion which is configured to move partially parallel to said chamber wall; said distal portion having a hole such vibration of said flap under changes of a pressure within said chamber, alternatively aligns said hole to said opening to permit fluid communication of said valve chamber with the environment and moves said hole out of alignment with said opening to block fluid communication of said valve chamber with the environment.

Yet another aspect of the present disclosure provides a pressure-responsive valve comprising a valve chamber defined by a chamber wall having one or more openings fluidly interconnecting said chamber with an external environment; and a valve flap configured for resonant vibration sequentially opening and at least partially blocking each of said one or more openings.

In some embodiments of the pressure responsive valve, the flap has a distal portion which is configured to move partially parallel to said chamber wall; said distal portion having a hole such that vibration of said flap under changes of a pressure within said chamber, sequentially aligns said hole to a first opening of said plurality of openings to permit fluid communication through said first opening and moves said hole out of alignment with said first opening to block fluid communication through said first opening while aligning said hole to a second opening of said plurality of openings to permit fluid communication through said second opening.

Yet another aspect of the present disclosure provides a valve being disposed at a flow line portion for controlling the flow profile through said flow line portion. The valve comprising at least one flow restricting element configured to continuously switch between one or more first range of states and one or more second range of states, wherein said one or more first ranges of states, the flow through the inlet or the outlet is less than the flow in one or more second ranges of states.

In some embodiments of the valve, the at least one flow restricting element is configured to resonate along a continuum of states between a first end state and a second end state defining therebetween said one or more first and second range of states.

In some embodiments, the valve comprising a single first range of first states and a single range of second states, wherein the first range of states is defined between a first end state and a transition state and the second range of states is defined between the transition state and the second end state.

In some embodiments of the valve, the at least one flow restricting element is a flap or a leaf.

In some embodiments of the valve, the flap is fixed at one of its side and an opposite, free side with its edge being proximal to a wall portion of said flow line; and while resonating the distance between said edge and said wall portion varies defining whether the flow restricting element is in the first range of states or in the second range of states.

In some embodiments of the valve, the free side of the flap is configured for contact free harmonically oscillation.

In some embodiments of the valve, the fluid line portion has a varying longitudinal cross section profile, said at least one flow restricting element spans at least a portion of said longitudinal cross section profile and is deformable to define said one or more first range of states and said one or more second range of states.

In some embodiments of the valve, the at least one flow restricting element is harmonically oscillating between deformation states defining said one or more first range of states and said one or more second range of states.

In some embodiments of the valve, the first state is defined by restricting flow of fluid by at least 30% with respect to the second state.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION

Figure 1A:
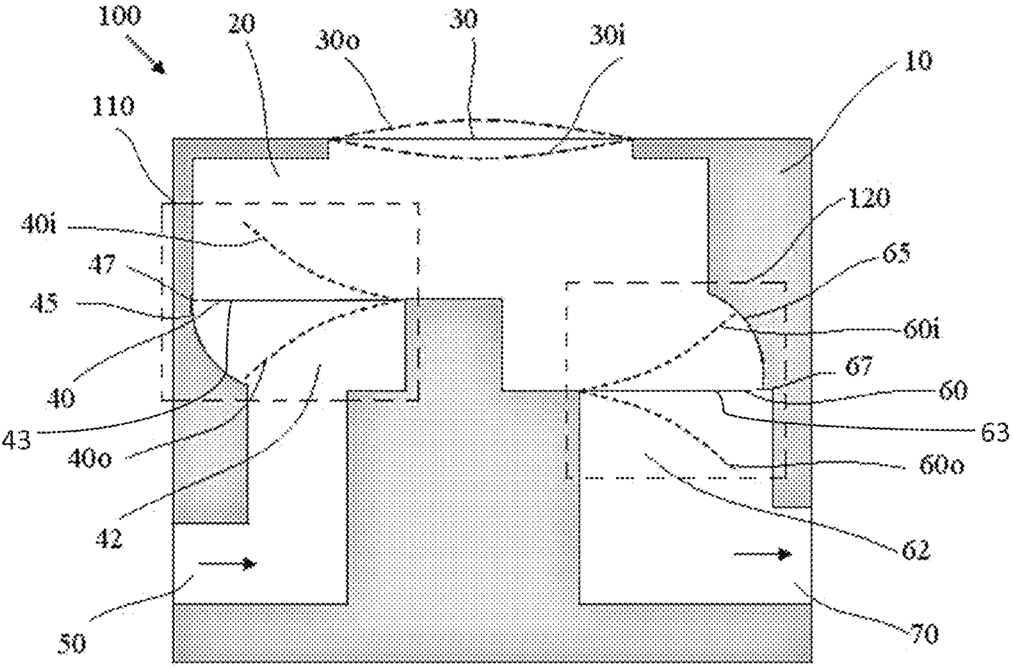
FIGS. 1A-1C are schematic illustrations of a longitudinal cross section of an example of an embodiment of the fluid pumping arrangement according to an aspect of the present disclosure.
Figure 1B:
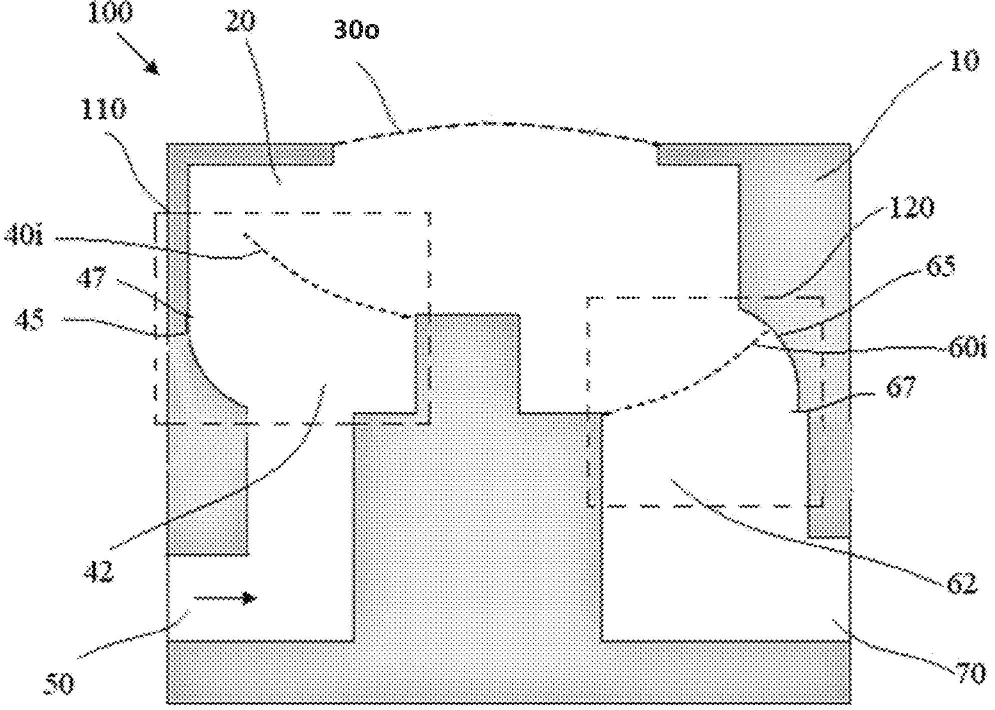
Figure 1C:
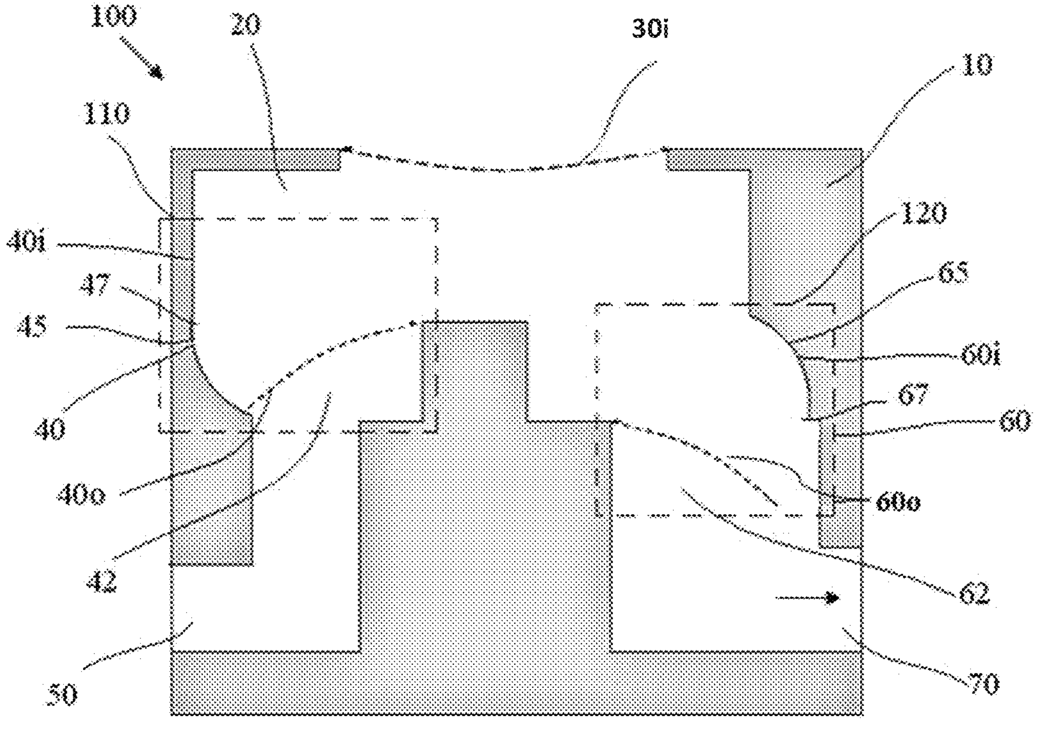

Reference is made to FIGS. 1A-1C, which are schematic illustrations of a longitudinal cross section of a non-limiting example of a pump according to an aspect of the present disclosure.

FIG. 1A shows a pump 100, having a housing 10 defining a pump chamber 20, a fluid inlet 50 and a fluid outlet 70. The pump chamber 20 is defined downstream the fluid inlet 50 and upstream the fluid outlet 70. An inlet flow restricting element 40 is disposed at a first flow path portion 110 so as to control the inflow of fluid into the chamber 20 through a flow line portion 42. An outlet flow restricting element 60 is disposed at a second flow path portion 120 so as to control the outflow of fluid from the chamber 20 through a flow line portion 62. Each of the inlet and outlet flow restricting elements 40 and 60 are configured to continuously oscillate between a first end state 40*o*/60*o* and a second end state 40*i*/60*i* (the first and second end states are shown in dash lines), wherein a transition state, 43/63, optionally being resting, neutral state is defined between the first end state 40*o*/60*o* and the second end state 40*i*/60*i*. The inlet and outlet flow restricting elements 42 and 62 are either configured to (i) rotate about axes defined by the attachment profile of the restricting elements to the housing thereby allowing the oscillation between the first and second positions, or (ii) to elastically deform in response to forces applied thereon. The inlet flow restricting element 42 is transitionable between at least two ranges of states, a first, flow permitting range of states and a second, flow restricting range of states. At this non-limiting example, the flow permitting range of states is defined between the transition state 43 and the second end state 40*i*, and the flow restricting range of states is defined between the transition state 43 and the first end state 40*o*. The outlet flow restricting element 62 is transitionable between at least two ranges of states, a first, flow permitting range of states and a second, flow restricting range of states. At this non-limiting example, the flow permitting state is defined between the transition state 63 and the first end state 60*o* and the flow restricting state is defined between the transition state 63 and the second end state 60*i*. The geometric profile of the walls of the housing resulting the transition between the states according to the position of the oscillation of the flow restricting elements. Along the range of the flow restricting states of the flow restricting elements, the geometric profile of the walls 45/65 is designed to maintain a narrow gap 47 between the flow restricting element and the wall, thus substantially restricting the flow into and out of the chamber 20. The geometric profile of the walls along the range of the flow permitting states of the flow restricting elements is designed to maintain a relatively large gap allowing non-restrictive flow into and out of the chamber.

A driver 30 is configured to modulate the volume within the chamber 20 between a first volume resulting from a first driver state 30*o* and a second volume resulting from a second driver state 30*i* at a resonating characteristic frequency profile to thereby cause the flow restricting elements 42/62 to matchingly resonate at the characteristic frequency profile and therefore continuously transition between the flow restricting state and the flow permitting state. The driver 30 in this non-limiting example comprises a resonating membrane or diaphragm that is driven at the characteristic frequency profile between the first and second driver states 30*o* and a second driver state 30*i*, the second driver state 30*i* results in a chamber volume smaller than that resulted by the first driver state 30*o*.

The inlet and outlet flow restricting elements are typically resonate in a phase shift between them, and in some specific embodiments the flow restricting elements resonate in an antiphase manner, namely that when one is in a flow restricting state the other is in a flow permitting state and vice versa. Reference is specifically made to FIGS. 1B-1C, which exemplify the antiphase operation of the two flow restricting elements. FIG. 1B shows the driver in the first state 30*o*, the inlet flow restricting element 40 is in the flow permitting state range defined by any state at the range between the second end state 40*i* and the transition state 43 and the outlet flow restricting element 60 is in the flow restricting state defined by any state at the range between the second end state 60*i* and the transition state 63. FIG. 1C shows the driver in the second state 30*i*, the inlet flow restricting element 40 is in the flow restricting state defined by any state at the range between the first end state 40*o* and the transition state 43 and the outlet flow restricting element 60 is in the flow permitting state defined by any state at the range between the first end state 60*o* and the transition state 60.

The pump 100 operates continuously and the states of the flow restricting elements continue to switch in relation to the resonating characteristic frequency profile. In other words, in every time period of a resonance cycle of the driver, each of the flow restricting elements switches between the first and the second state one time and spends half of the time period in each state.

The flow restricting elements harmonically resonate around the resting position and in a first rotational direction from the resting position they enter a flow restricting state and in a second rotational direction from the resting position they enter a flow permitting state. The harmonic forces acting on the flow restricting elements, both intrinsic and external forces, resulting in that the strongest forces act at the end of the range of the harmonic oscillation for each state, therefore allowing a very fast transitions between states by using the harmonic resonance effect. In some embodiments, the frequency of said driver and/or a resonance frequency of a valve may range between 1 to 20 Hz and/or between 20 to 100 Hz and/or between 100 to 1000 Hz and/or between 1000 Hz to 10000 Hz and/or between 10000 Hz to 25000 Hz and/or between 25000 Hz to 200000 Hz. For example, the frequency of said driver and/or a resonance frequency of a valve may range in an audible frequency between 20 Hz to 20 kHz and/or a range out of the audible frequency for example between 25000 Hz to 250000 Hz.

Figure 2:
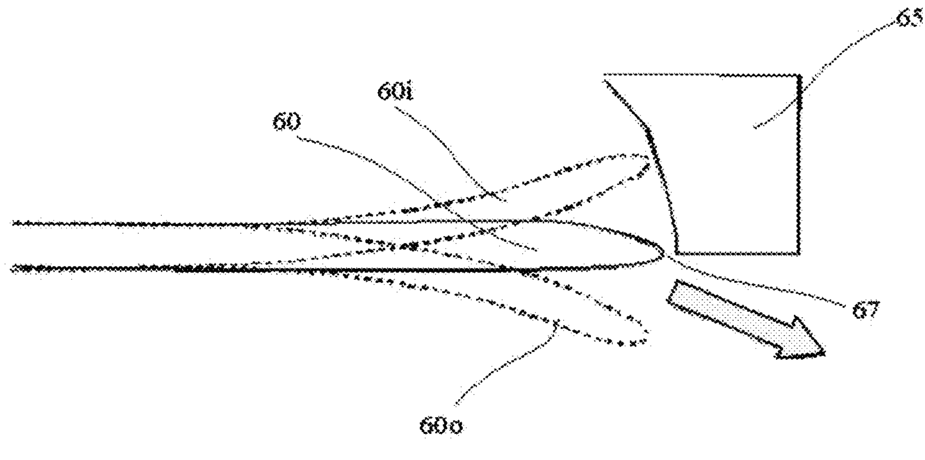
FIG. 2 is a schematic illustration of a longitudinal cross section exemplifying the different states of the flow restricting element of the present disclosure.
Figure 3:
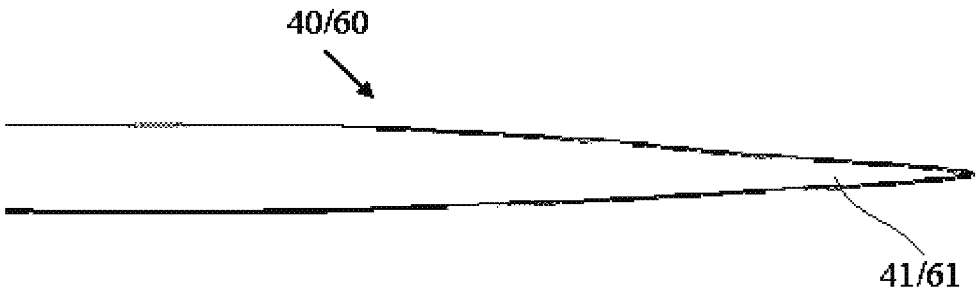
FIG. 3 is a schematic illustration of a longitudinal cross section exemplifying the geometric profile of the flow restricting element of the present disclosure.

Reference is now made to FIG. 2, which is a schematic illustration of a longitudinal cross section of an example showing different states of the flow restricting element. The flow restricting element 60 is in the form of a continuously oscillating flap, which is continuously transitioning between a flow permitting range of states, exemplified by the first end state 60*o* that is diverted from the transition state towards a first side, and a flow restricting state, exemplified by the second end state 60*i* that is diverted from the transition state towards a second side, opposite the first side. The state of the flow restricting element is defined by its relationship with the geometrical profile of the wall portion 65 that results in the desired gap 67 between the wall and the flow restricting element 60, being a relatively large gap in a flow permitting state and relatively narrow gap in a flow restricting state. FIG. 3 specifically exemplifies a longitudinal cross section of a flow restricting element 40/60 being shaped in a tapered manner. Alternatively or additionally, a flap may have a constant thickness. Alternatively or additionally, one portion of the flap by have a constant thickness while another portion is tapered. For example, between 0 to 10% and/or between 10 to 30% and/or between 30 to 60% and/or between 60 to 90% and/or between 90 to 100% of the flap may be tapered. Alternatively or additionally, the tapering may be near the fixed end and/or near the free end and/or both (for example, a middle portion of the flap may have uniform thickness).

To improve reproducibility of flap resonant frequency, mass, length or stiffness of the flaps are calibrated to match the resonance frequency of the driver.

Means for adjusting the resonance frequency of the flaps such as applying electromagnetic field to the flaps in the field, a flap holder adjustable by a screw or real time varying flap temperature by an individual microheating element are in the scope of the present invention. The resonant frequency can be also adjusted by piezoelectric drivers. Adjustment efficiency can be estimated according output flow and pressure monitoring data. Piezo drivers may also be used for this purpose.

Figure 4:
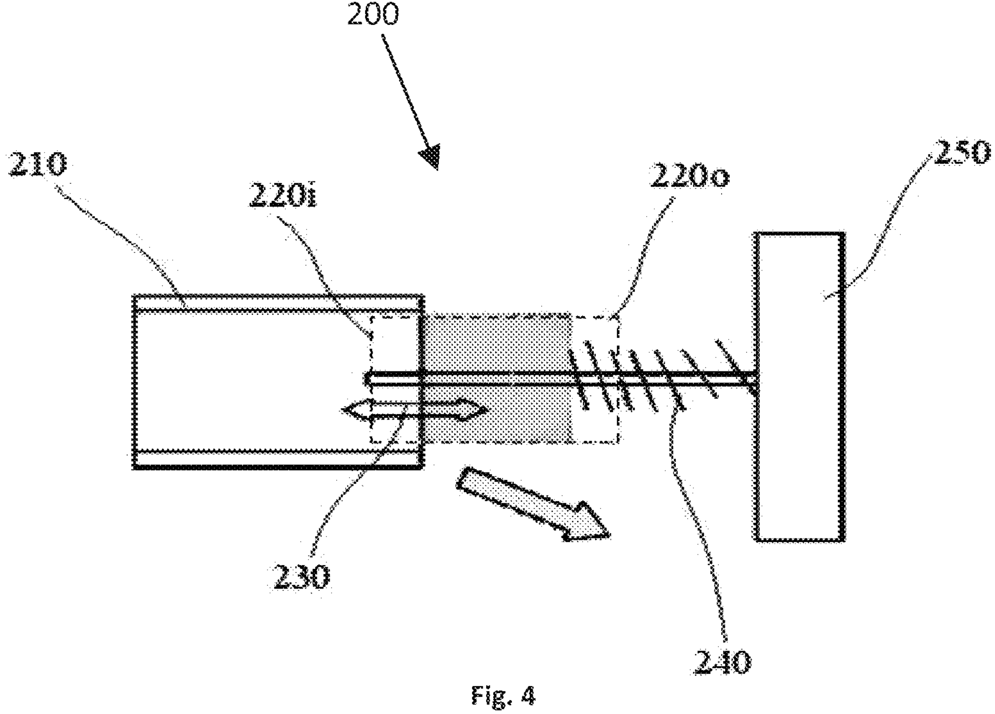
FIG. 4 is a cross-sectional view of a cylindrical valve with an oscillating piston in accordance with an embodiment of an aspect of the present disclosure.
Figure 5:
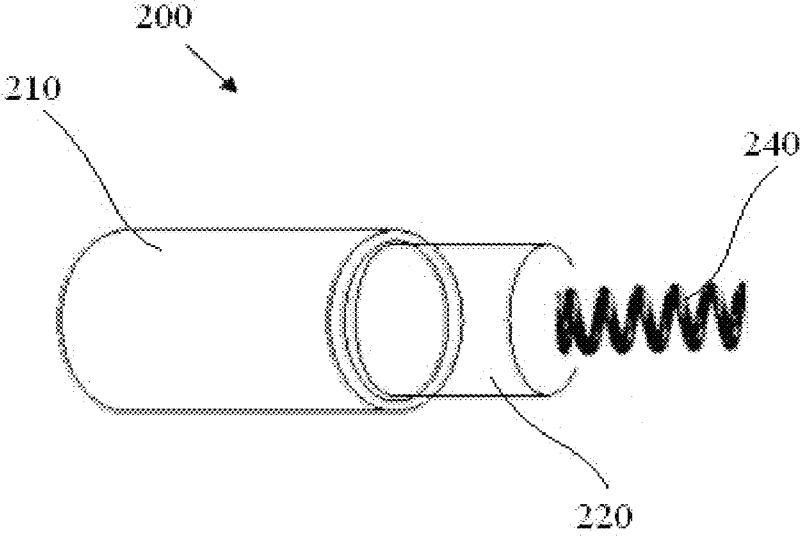
FIG. 5 is an isometric view of a cylindrical valve with an oscillating piston in accordance with an embodiment of an aspect of the present disclosure.

Reference is now made to FIGS. 4 and 5, showing in a non-limiting manner an embodiment of a non-contact check valve 200 comprising a cylinder 210 and a valve flap in the form of a piston 220 (end positions are referred as 220*i* and 220*o*). Analogously with the valve configuration exemplified in FIGS. 1A-1C, a gap between cylinder 210 and piston 220 is sufficiently narrow for blocking of the passage and sufficiently wide for contact-free resonant oscillation of the piston 220. A biasing element 240 optionally includes an elastic element such as a spring. The biasing element 240 connects between the mobile piston and an immobile portion 250 of the pump body. Optionally, the piston sequentially moves between the flow permitting state 220*o* where it is not blocking flow through the cylinder 210 and the flow restricting state 220*i* where it restricts flow through the cylinder 210. In some embodiments the piston moves in response to changes in fluid pressure. Alternatively or additionally, movement is driven by resonant oscillation and/or active forcing.

In some embodiments, a flow direction of the pump can be switched by changing the phase relationship between driver and a valve movement and/or between the pressure phase in the pump chambers and valve movement. The aforesaid switch can be achieved by means of a slight change in a frequency of a driver (for example a membrane) which results in phase trailing or leading each valve relative to the membrane and/or a change in the flow direction.

Figure 6:
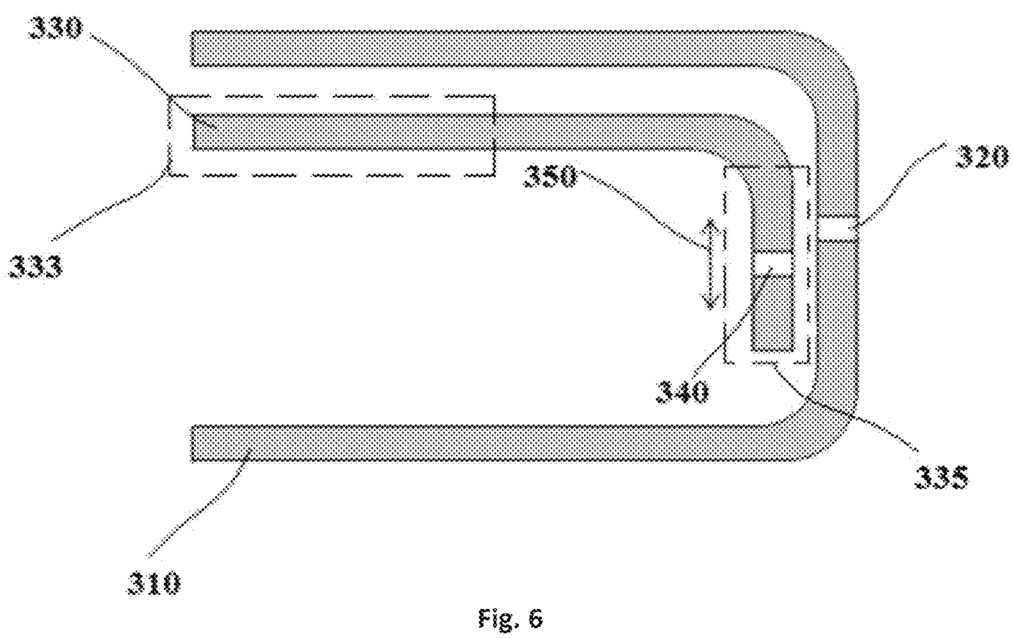
FIG. 6 is a schematic view of a one-way valve in accordance with an embodiment of an aspect of the present disclosure.

Reference is now made to FIG. 6, presenting a one-way valve illustrated by a portion of a valve chamber wall 310 provided with an opening 320. A valve flap 330 can displace (vibrate) in a direction 350 parallel to a portion of wall 310. The flap has an opening 340, which is biased to a normal position which is displaced relative to the opening 320. In other words, in normal position, the valve is closed. When pressure in the pump chamber increases, the flap 330 is displaced up and coincides with the opening 340. This up position of the flap 330 allows the pressurized fluid (e.g. liquid or gas) accommodated within the valve chamber to be blown off.

For purposes of the present invention, the term "proximal end" 333 of the flap member refers to a flap member portion in proximity to a member holder (not shown) while the term "distal end" 335 refers to an opposite portion provided with an opening. Specifically, proximal and distal portions are marked as 333 and 335, respectfully.

In some embodiments, flap 330 may be tuned. For example, when the valve is being used in a device having a characteristic stroke frequency, flap 330 may be tuned to resonate at the characteristic frequency.

Figure 7:
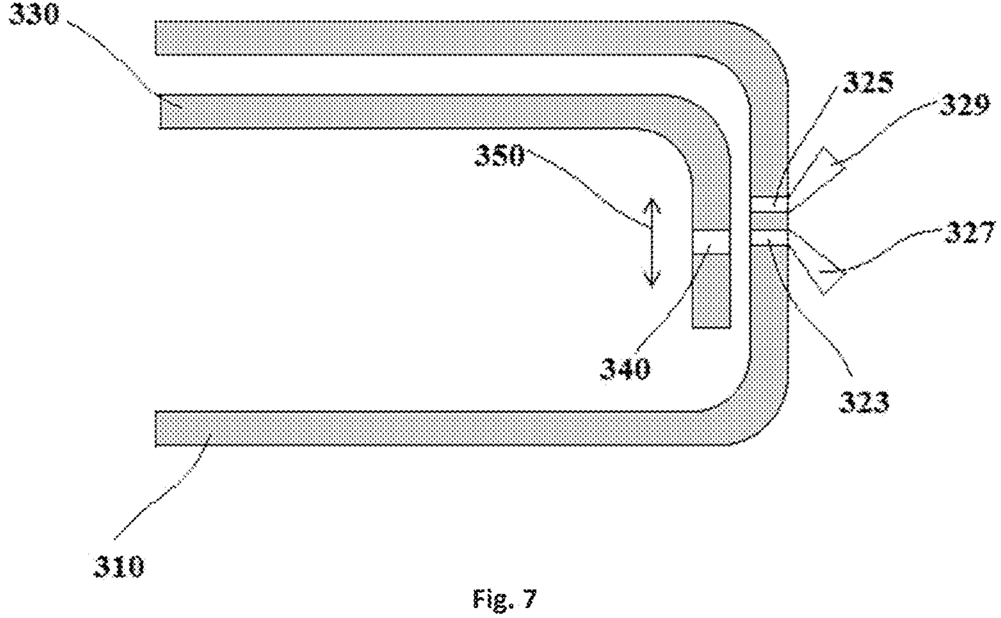
FIG. 7 is a schematic view of a two-way valve in accordance with an embodiment of an aspect of the present disclosure.

Reference is now made to FIG. 7, presenting a two-way valve. According to this embodiment of the present invention, the valve chamber wall 310 is provided with two openings 323 and 325 which are in a fluid connection with pipes 327 and 329, respectively.

A vibrating valve flow 330 blocks alternatively the top opening 325 in response to changes in pressure inside the valve chamber. In this position, the air accommodated in the valve chamber is discharged through the lower opening 323 and pipe 327. The aforesaid opening 323 is blocked when the air pressure inside the valve chamber is low. At the same time, outer air enters the valve chamber through the top opening 325 and pipe 329.

In some embodiments, flap 330 may be tuned. For example, when the valve is being used in a device having a characteristic stroke frequency, flap 330 may be tuned to resonate at the characteristic frequency.

It should be emphasized that according to the present invention, the flap is narrow, so fluid (e.g. liquid or gas in the chamber) can freely flow around the flap as needed.

It should be emphasized that in the claimed micro-pump there is any mechanical contact between the oscillating flaps 40 and 60 and the non-movable part 45 and 65, respectively. The proposed technical solution prevents the oscillating flaps 40 and 60 from wear that occurs in the known standard flap valves. Moreover, during operation, mechanical contact between the valve flap and seat the results in substantial losses, specifically, in generation of substantial level of heat and noise. In the claimed micro-pump, energy losses are minimized.

In accordance with one embodiment of the current invention, a resonant membrane micro-pump 100 for providing fluid pressure is disclosed. The aforesaid pump 100 comprises: (a) a pump chamber 20; (b) a resonantly driven membrane 30, the membrane is configured to modulate a pressure of a fluid accommodated in the pump chamber 20; (c) an inlet check valve 110 adapted for inflowing the fluid into the chamber 20; (d) an outlet check valve 120 adapted for outflowing the fluid from the chamber 20. Each valve comprises a passage 42/62 adapted for conducting a fluid flow and a blocking element adapted for intermittently blocking the fluid flow.

In some embodiments, the blocking elements of the valves 110 and 120 having a geometric shape and a mass distribution thereof matched with resonant coherent oscillation in said passages 42 and 62, respectively, when excited by the membrane 30 such that the blocking elements block the fluid flow in an antiphase manner.

In accordance with another embodiment of the current invention, the membrane 30 and the flaps 40 and 60 are configured for resonant oscillation out of audible frequencies.

In accordance with a further embodiment of the current invention, the blocking element is a resonantly oscillating flap 40/60.

In accordance with a further embodiment of the current invention, the flap 40/60 is configured for partially blocking the passage 42/62 with a gap 47/67 between the fixed member 45/65 and the flap 40/60 being sufficiently narrow for blocking of the passage 42/62 and generating a fluid outflow. The gap 47/67 provides sufficient clearance for contact-free resonant oscillation of said flap 40/60.

In accordance with a further embodiment of the current invention, the flap is of a tapered shape.

In accordance with a further embodiment of the current invention, the blocking element is a resonantly oscillating piston 220 connected to an abutment 250 by means of a spring 240.

In accordance with a further embodiment of the current invention, a method of providing fluid pressure is disclosed. The aforesaid method comprises the steps of: (a) providing a resonance membrane micro-pump 100 for providing fluid pressure; the aforesaid pump 100 comprising (i) a pump chamber 20; (ii) a harmonically driven membrane 30, the membrane is configured to modulate a pressure of a fluid accommodated in the pump chamber 20; (iii) an inlet check valve 110 adapted for inflowing said fluid into the chamber 20; (iv) an outlet check valve 120 adapted for outflowing the fluid from the chamber 20; each valve comprises: a passage 42/62 adapted for conducting a fluid flow and a blocking element adapted for intermittently blocking said fluid flow; the blocking elements of the valves 110 and 120 have a geometric shape and a mass distribution thereof such that said blocking elements are matched with resonant coherent oscillation in said passages 42 and 62, respectively, when excited by said membrane 30 such that said blocking elements block said fluid flow in an antiphase manner.

In some embodiments, the step of blocking the fluid flow performed by resonantly oscillating blocking elements 40 and 60 in the passages 42 and 62, respectively, when excited by the membrane 30.

In accordance with a further embodiment of the current invention, the membrane 30 and the flaps 40 and 60 resonantly oscillate at a frequency out of audible frequencies.

In accordance with a further embodiment of the current invention, the step of blocking the passage 42/62 is performed by resonantly oscillating flaps 40 and 60.

In accordance with a further embodiment of the current invention, the passage 42/62 is partially blocked by the flap 40/60, so that a gap 47/67 between the fixed member 45/65 and the flap 40/60 is sufficiently narrow for blocking of the passage 42/62 and generating a fluid outflow. The gap 47/67 provides sufficient clearance for contact-free resonant oscillation of said flap 40/60.

In accordance with a further embodiment of the current invention, the step of blocking the passage 42/62 is performed by said flap 40/60 of a tapered shape.

In accordance with a further embodiment of the current invention, the step of blocking said passage 42/62 is performed by a resonantly oscillating piston 220 connected to an abutment 250 by means of a spring 240.

In some embodiments, a valve of the present invention is formed using micro techniques, for example like an integrated circuit and/or an electronic chip. For example, a valve may be fabricated by a photolithography, deposition (such as chemical vapor deposition), and/or etching. The main process steps are optionally supplemented by doping and etching, ion beam milling etc.

Figure 8:
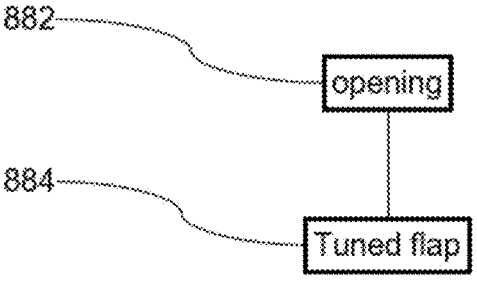
FIG. 8 is a block diagram of a valve in accordance with an embodiment of an aspect of the present disclosure.

FIG. 8 is a block diagram of a valve in accordance with an embodiment of the current invention. In some embodiments, a valve includes an opening 882 and a flap 884. For example, the flap 884 may have a closed position where it blocks (and/or partially blocks) flow through the opening and/or an open position where fluid is allowed to flow relatively freely through the opening. Optionally the flap oscillates between the open and closed positions either as a result of changes in fluid pressure and/or under driving of an active mechanism. Optionally, the flap 882 resonance frequency. For example, the resonance frequency may be adjusted to correspond to a driving frequency of flow.

Figure 9:
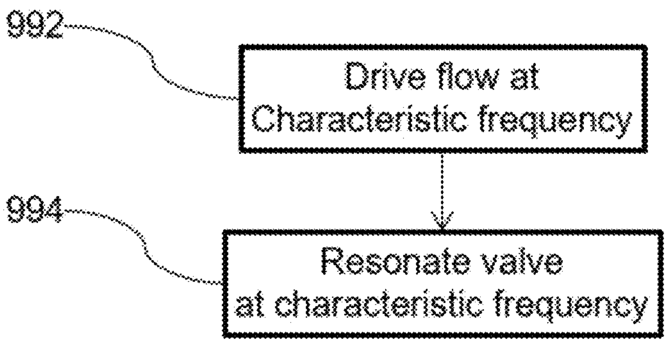
FIG. 9 is a flow chart illustration of a method of controlling fluid flow in accordance with an embodiment of an aspect of the present disclosure.

FIG. 9 is a flow chart illustration of a method of controlling fluid flow in accordance with an embodiment of the current invention. In some embodiments, flow is driven 992 as a characteristic frequency. Optionally a valve oscillates between an open state and a closed state (for example fully closed and/or partially closed). Optionally the valve is tuned such that oscillation of the valve between the open and closed state has resonance frequency matching the characteristic driving frequency. For example, the valve may resonate 994 at the characteristic driving 992 frequency.

The invention claimed is:

1. A fluid pumping arrangement for pumping a fluid between a fluid inlet and a fluid outlet, comprising:

a chamber which comprises an inlet and an outlet;

at least one flow restricting element disposed at a flow line portion and configured to resonate along a continuum of states between a first end state and a second end state, thereby affecting a fluid flow profile through said inlet or said outlet, wherein the at least one flow restricting element restricts the flow through the inlet or the outlet more in one or more first ranges of states than the at least one flow restricting element does in one or more second ranges of states;

a driver configured to modulate conditions in the chamber or on the at least one flow restricting element at a characteristic frequency profile, thereby inducing the at least one flow restricting element to matchingly resonate between the first and second end states at about said characteristic frequency profile;

wherein the at least one flow restricting element has a free end;

wherein while resonating, the relation between said free end and a wall portion in the flow line portion varies defining whether the at least one flow restricting element is in the first range of states or in the second range of states;

wherein the free end of the at least one flow restricting element is configured for contact-free harmonic oscillation.

2. The fluid pumping arrangement of claim 1, wherein said at least one flow restricting element is disposed at the inlet.

3. The fluid pumping arrangement of claim 1, comprising two flow restricting elements, an inlet flow restricting element disposed at the inlet and an outlet flow restricting element disposed at the outlet.

4. The fluid pumping arrangement of claim 3, wherein the inlet flow restricting element and the outlet flow restricting element are configured to switch between the first and the second range of states in an antiphase manner.

5. The fluid pumping arrangement of claim 1, comprising a single first range of states and a single second range of states, wherein the single first range of states is defined between a first end state and a transition state and the single second range of states is defined between the transition state and a second end state.

6. The fluid pumping arrangement of claim 1, wherein said driver is configured to modulate the chamber's volume or pressure at said characteristic frequency profile.

7. The fluid pumping arrangement of claim 1, wherein said at least one flow restricting element is a flap or a leaf, wherein said flap or leaf has a fixed end opposite to the free end, an edge of the free end being proximal to the wall portion of said flow line; and while resonating, the distance between said edge and said wall portion varies defining whether the at least one flow restricting element is in the first range of states or in the second range of states.

8. The fluid pumping arrangement of claim 1, wherein said flow line portion has a varying longitudinal cross section profile, said at least one flow restricting element spans at least a portion of said longitudinal cross section profile and is deformable to define said one or more first range of states and said one or more second range of states, wherein said at least one flow restricting element is harmonically oscillating between deformation states defining said one or more first range of states and said one or more second range of states.

9. A method for generating fluid pressure, comprising:

modulating conditions in a chamber having a fluid inlet and a fluid outlet at a characteristic frequency profile;

wherein the fluid flow through at least one of said fluid inlet and fluid outlet is controlled by at least one fluid restricting element, and said modulating results in a matchingly continuum resonance oscillation of said at least one flow restricting element between first and second end states, wherein the at least one flow restricting element restricts the flow through the inlet or the outlet more in the one or more first ranges of states than the at least one flow restricting element does in one or more second ranges of states;

wherein the continuum resonance oscillation of the at least one flow restricting element is contact-free.

10. The method of claim 9, wherein the at least one fluid restricting element comprises an inlet fluid restricting element and an outlet fluid restricting element.

11. The method of claim 9, wherein said modulating comprises modulating the volume of said chamber.

12. The method of claim 9, wherein said at least one flow restricting element is harmonically oscillating between deformation states defining said one or more first range of states and said one or more second range of states.

13. A valve for disposal at a flow line portion for controlling the flow profile through said flow line portion, the valve comprising:

at least one flow restricting element configured to continuously switch between one or more first range of states and one or more second range of states, wherein the at least one flow restricting element restricts the flow through the inlet or the outlet more in the one or more first ranges of states than the at least one flow restricting element does in said one or more second ranges of states;

wherein the at least one flow restricting element has a free end;

wherein while resonating, the relation between the free end of the at least one flow restricting element and a wall portion in the flow line portion varies defining whether the at least one flow restricting element is in the first range of states or in the second range of states; and wherein the free end of the at least one flow restricting element is configured for contact-free harmonic oscillation.

14. The valve of claim 13, wherein the at least one flow restricting element is configured to resonate along a continuum of states between a first end state and a second end state defining therebetween said one or more first and second range of states.

15. The valve of claim 14, comprising a single first range of states and a single second range of states, wherein the single first range of states is defined between a first end state and a transition state and the single second range of states is defined between the transition state and a second end state.

16. The valve of claim 13, wherein said at least one flow restricting element is a flap or a leaf.

17. The valve of claim 16, wherein the flap or leaf has a fixed end opposite to the free end, an edge of the free end edge being proximal to the wall portion of said flow line; and while resonating, the distance between said edge and said wall portion varies defining whether the flow restricting element is in the first range of states or in the second range of states.

18. The valve of claim 13, wherein said flow line portion has a varying longitudinal cross section profile, said at least one flow restricting element spans at least a portion of said longitudinal cross section profile and is deformable to define said one or more first range of states and said one or more second range of states, wherein said at least one flow restricting element is harmonically oscillating between deformation states defining said one or more first range of states and said one or more second range of states.

* * * * *